US006729816B2

(12) United States Patent  
Booher

(10) Patent No.: US 6,729,816 B2  
(45) Date of Patent: May 4, 2004

(54) TRAILER BED WITH IMPROVED CARGO WELL

(75) Inventor: Howard Booher, Atwater, OH (US)

(73) Assignee: East Manufacturing, Randolph, OH (US)

( * ) Notice: Subject to any disclaimer, the term of this patent is extended or adjusted under 35 U.S.C. 154(b) by 0 days.

(21) Appl. No.: 10/194,933

(22) Filed: Jul. 12, 2002

(65) Prior Publication Data

US 2004/0009049 A1 Jan. 15, 2004

(51) Int. Cl.[7] .................................................. B60P 7/08
(52) U.S. Cl. ........................................... 410/49; 410/47
(58) Field of Search .............................. 410/47, 49, 50; 296/181, 182, 25; 280/789, 790, 799, 107

(56) References Cited

U.S. PATENT DOCUMENTS

| | | | | |
|---|---|---|---|---|
| 2,622,918 A | * | 12/1952 | Staffe | 410/49 |
| 3,481,627 A | | 12/1969 | Felburn | |
| 3,807,759 A | | 4/1974 | Vornberger | |
| 3,829,148 A | | 8/1974 | Stoneburner | |
| 4,315,707 A | | 2/1982 | Fernbach | 410/47 |
| 5,336,027 A | | 8/1994 | Paddock | 410/49 |
| 5,401,129 A | | 3/1995 | Eatinger | 410/49 |
| 5,425,608 A | * | 6/1995 | Reitnouer | 410/49 |
| 5,476,348 A | | 12/1995 | Shelleby | 410/49 |
| 5,622,116 A | | 4/1997 | Carlton | |
| 5,927,915 A | * | 7/1999 | Grove, Sr. | 410/49 |
| 5,944,349 A | | 8/1999 | Bowling | |
| 5,954,465 A | * | 9/1999 | Ellerbush | 410/49 |
| 6,190,100 B1 | * | 2/2001 | Mawji | 410/49 |
| 6,250,860 B1 | * | 6/2001 | Hornady | 410/47 |

OTHER PUBLICATIONS

Brookfield Aluminum Flatbed Trailers, P.O. Box 248, 501 W. Helm, Brookfield, Missouri 64628; Specification Sheet; 1 page.

* cited by examiner

Primary Examiner—Stephen T. Gordon  
(74) Attorney, Agent, or Firm—Hahn Loeser & Parks, LLP; Robert J. Clark

(57) ABSTRACT

A cargo well configuration that significantly increases the strength of the neck area of the trailer by providing a novel cargo well attachment providing superior strength and load carrying capacity. The improved cargo well of the present invention comprises a first I-beam and a second I-beam positioned generally parallel to each other. Each of the I-beams comprises a web portion, a chord portion generally perpendicular to the web portion, and an extension portion at an end of the chord portion positioned generally parallel to the web portion. The cargo well further comprises a metal plate extending between and fixably attached to the web portion of the first I-beam and the web portion of said second I-beam. The metal plate is fixably attached to the extension portion of the first I-beam and the extension portion of the second I-beam.

14 Claims, 2 Drawing Sheets

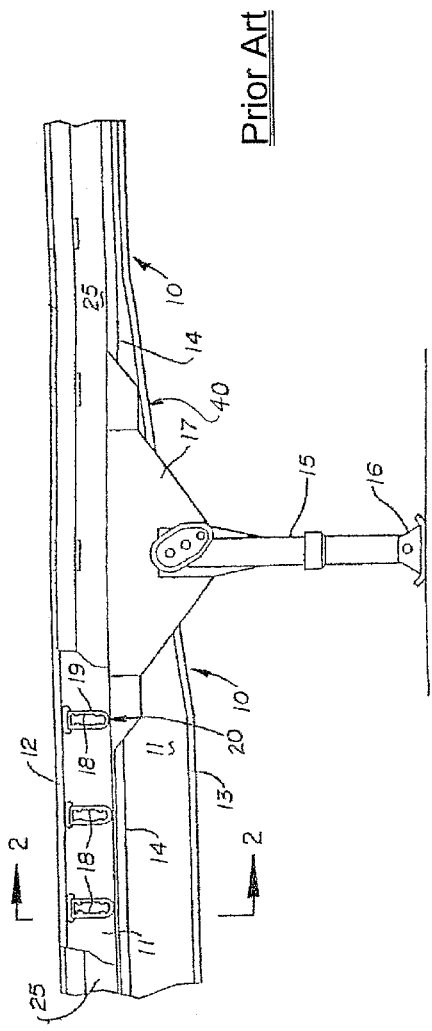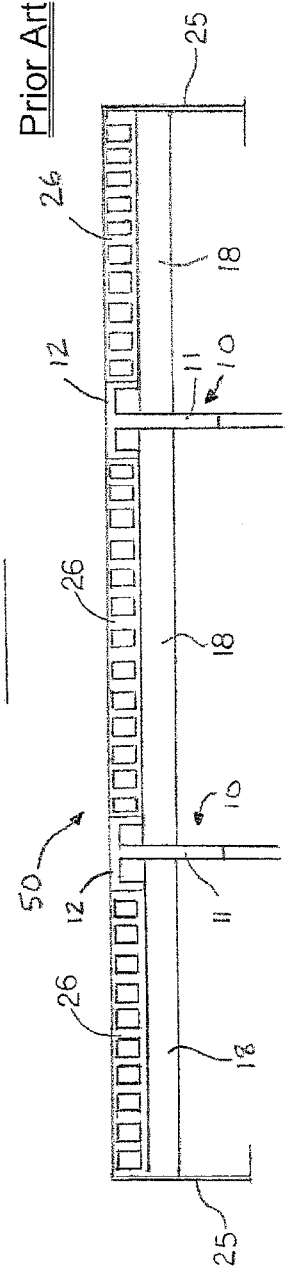

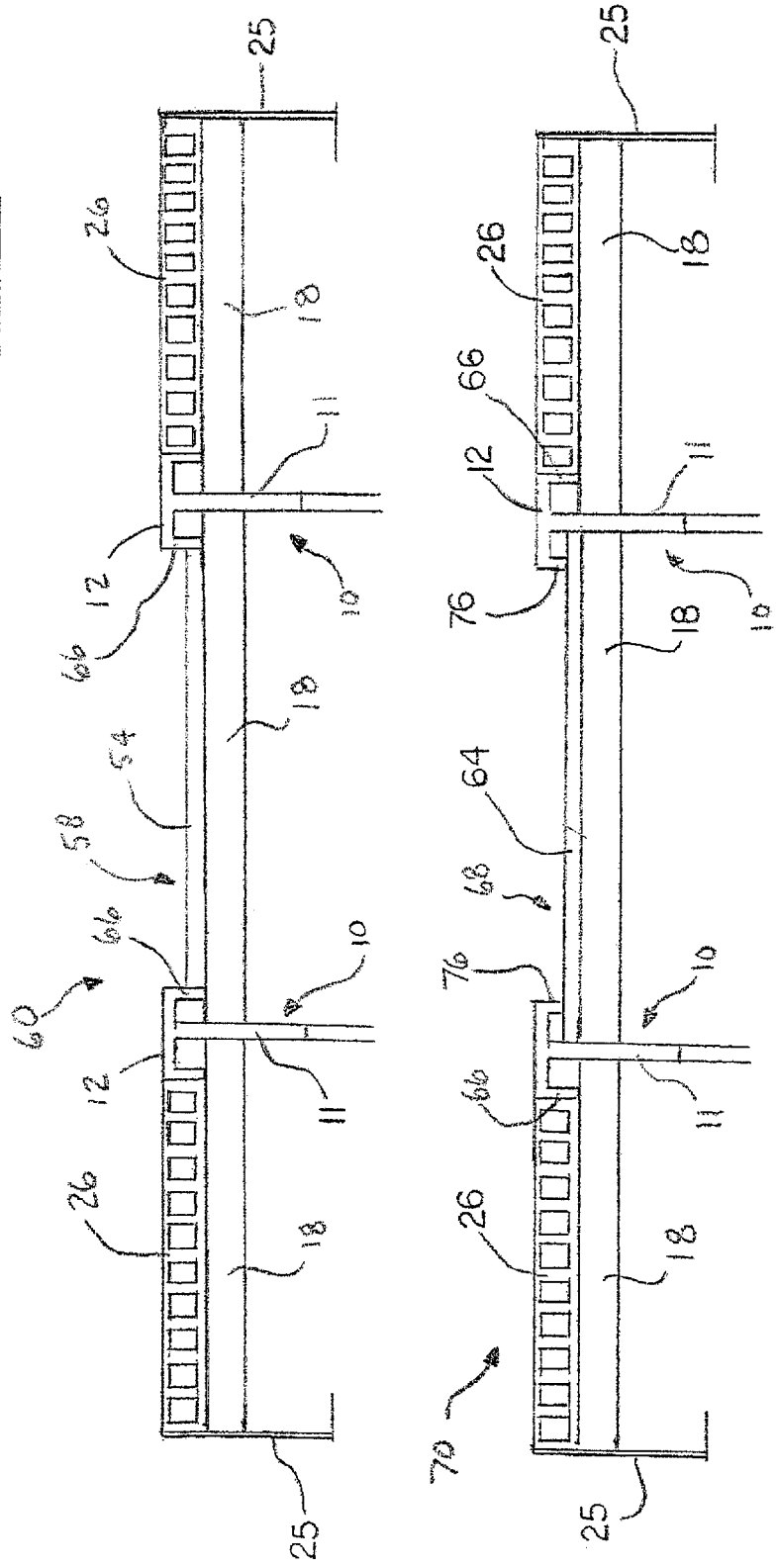

TRAILER BED WITH IMPROVED CARGO WELL

FIELD OF THE INVENTION

The present invention relates generally to an improved cargo well for increasing the strength of a trailer. More particularly, the invention relates to a cargo well configuration that significantly increases the strength of the neck area of the trailer.

BACKGROUND OF THE INVENTION

Cargo of various types is transported by a variety of means, such as flat bed trailers, which are designed to transport various loads positioned on the trailer bed along its length, or at discrete locations thereon. In many cases, the loads carried by such trailers or other vehicles may be bulky and irregular in shape and/or weight distribution, adversely effecting stability of the load on the trailer. Coils or rolls of stock material, such as sheets of aluminum, steel, mill-rolls, belting, or the like, are frequently transported on the top of the flatbed of a truck or other vehicle. These coils can weigh as much as 15 to 25 thousand pounds, the length of the coil may vary up to 4 feet, and the diameter is usually approximately four feet. This provides a significant challenge to the trailer manufacturer to provide sufficient strength to handle these compact or point loads while minimizing the weight of the trailer to optimize performance and capacity.

It is currently common practice in the industry that a coil is secured on a flatbed trailer by placing it on top of a removable set of two parallel wooden beams with square cross-section, such as 4 inch by 4 inch conventional wooden beams. The beams keep the coil off the ground or supporting surface and serve as two edges of contact with the coil. The coil is typically elevated from the trailer floor in order to prevent the coil from rolling back and forth between the beams. Certain manufacturers require the beams to have a bevel along the top longitudinal edge facing the coil to prevent sharp edges from impacting against the coil and potentially damaging said coil. These parallel beams are held in their relative position using two cross members that extend underneath and perpendicularly to each parallel beam. At each end, these cross members are bent upwardly, then backwardly toward the opposite end, and finally downwardly, to form a generally D-shaped or triangularly shaped back stopper disposed on the outside of the beams to maintain their relative parallel position. These parts are not attached to one another, which assists in removal of the set-up. Using this set-up, a coil is placed on top of and between the parallel beams atop the cross-members. The coil is then tied down to the trailer bed with chains and chain binders. These chains are typically placed laterally over the coil with the ends of the chains secured to the trailer and tension supplied to the chains through conventional chain binders. Additional chains may be placed longitudinally along the coil through its central core and tied to the trailer similarly.

In aluminum flatbed trailers, the floor is typically comprised of aluminum in a honey comb or hollow configuration to add additional strength. The floors are supported by cross beam members connected to two mainframe beams. In order to accommodate the heavy coil loads, manufacturers have added additional support cross beams and/or have replaced the center portion of the floor between the two mainframe beams with a solid aluminum plate. As the aluminum plate is not as thick as the rest of the flatbed trailer floor, a well is created between the two main frame beams. The well creates a depression which helps secure the coil support members such as the removable parallel wooden beams. The above mentioned improvements have greatly enhanced the strength of the flatbed trailer, however weak areas still may exist at locations such as the neck area of the platform trailer.

SUMMARY OF THE INVENTION

The present invention overcomes these deficiencies noted in the prior art by providing a novel cargo well attachment providing superior strength and load carrying capacity. The improved cargo well of the present invention comprises a first I-beam and a second I-beam positioned generally parallel to each other. Each of the I-beams comprises a web portion, a chord portion generally perpendicular to the web portion, and an extension portion at an end of the chord portion positioned generally parallel to the web portion. The cargo well further comprises a metal plate extending between and fixably attached to the web portion of the first I-beam and the web portion of said second I-beam. The metal plate is fixably attached to the extension portion of the first I-beam and the extension portion of the second I-beam.

BRIEF DESCRIPTION OF THE DRAWINGS

FIG. 1 is a partial side elevational view of a typical flatbed trailer, representing the type of vehicle with which the present invention may be utilized.

FIG. 2 is a cross-section of the bed portion associated with the trailer as shown in FIG. 1, being representative of a type of flatbed construction known in the art.

FIG. 3 is a cross-section of the bed portion associated with the trailer as shown in FIG. 1, being representative of a coil well type of flatbed construction known in the art.

FIG. 4 is a cross-section of the bed portion associated with the trailer as shown in FIG. 1, having an improved coil well construction of the present invention.

DETAILED DESCRIPTION OF THE INVENTION

By referring to the drawings and FIG. 1 in particular, it will be seen that a known flat bed trailer structure is disclosed which is preferably formed of aluminum extruded and fabricated sections. The portion of the flat bed trailer seen in FIG. 1 comprises a portion inwardly of the front end thereof. The trailer structure is formed of a pair of longitudinally disposed I-beams 10 comprising web portions 11 with upper and lower horizontally disposed flanges or chords 12 and 13 respectively. The I-beams 10 are each formed of a pair of T-shaped extrusions welded to one another longitudinally on a weld line 14. The forward portion of the flat bed trailer has the I-beams 10 of reduced height by forming one of the web portions 11 in a tapered shape below the weld line 14, this area in generally referred to as the neck area 40 of the trailer. A retractable double leg support 15 having pivoted ground engaging shoes 16 is attached to the forward portion of the flat bed trailer by semi-triangular mounting brackets 17 which are secured to several of a plurality of transversely positioned tubular frame members 18 which are located in longitudinally spaced transversely registering apertures 19 in the upper portions of the webs 11 of the longitudinally extending I-beams 10 as illustrated in FIGS. 1 and 2 of the drawings.

By referring to FIG. 1 of the drawings, it will be seen that three of the tubular frame members 18 are shown double welded in three of the apertures 19, a portion of an outside rail 25 being broken away. Each of the tubular frame members 18 are double welded in position in each of the pairs of transversely registering apertures 19 formed in the upper portions of the webs 11 of the I-beams 10. Each of the opposite spaced vertical side walls of the tubular frame member 18 are welded by fillet welds to the portions of the I-beam web 11 defining the vertical walls of the aperture 19 therein so as to result in double welds joining the side walls of the tubular frame members 18 to the I-beams 10. The lower portion of the aperture 19 is cross sectionally curved in a half circular shape matching that of the bottom portion 20 of the tubular frame members 18 which fit snugly therein.

By referring now to FIG. 2 of the drawings, a transverse section, through the flat bed trailer 50 may be seen and by referring thereto one of the transversely positioned tubular frame members 18 will be seen positioned through the webs 11 of the I-beams 10. It will also be seen that the upper transversely disposed portions 12 of the I-beams 10 form a portion of the floor of the flat bed trailer. Several longitudinal extending compartmented hollow flooring sections 26 are positioned longitudinally of the flat bed trailer in abutting parallel relation with vertical extending portions 66 of the upper transversely disposed portions 12 of the I-beams 10 and welded thereto. The flooring sections 26 are also welded to each of the transversely positioned tubular frame members 18 which support the same.

The ends of each of the transversely positioned tubular frame members 18 abut the inner surface of the outside rails 25 and are welded thereto. The flooring sections 26 rest on the upper straight top portion of each of the transversely positioned tubular frame members 18 and the upper surfaces of the flooring sections 26 are on the same level as the upper surfaces of the transversely disposed portions 12 of the I-beams 10.

The known flat bed trailer structure disclosed herein is formed of aluminum extrusions welded to one another in the finished flat bed trailer assembly and the spaced longitudinally extending I-beams 10 are fabricated from two such aluminum extrusions, each of which is T-shaped and which extrusions are arranged with one upright and one inverted and joined together by welding them continuously to one another on the weld line 14 hereinbefore referred to. The assembly of the I-beams from the two T-shaped aluminum extrusion enables the plurality of apertures 19 in each of the web portions 11 of the I-beams 10 to be stamped therein with a controlled size and configuration which insures the accurate and desirable positioning of the transversely positioned tubular frame members 18 where they may be easily and efficiently double welded and serve not only to cross brace the I-beams 10, but provide continuous side to side supporting structure for the flooring of the flat bed trailer structure.

Referring to FIG. 3, a cross-sectional view of another known floor 60 having a coil well 58. The floor system 60 is shown to comprise a plurality of extruded floor sections 26 as previously described, but also comprises a flat solid sheet of metal 54, preferably aluminum, positioned and extending between the vertical extending portions 66 at the ends of the upper transversely disposed portions 12 of the I-beams 10. The metal sheet 54 is welded to each of the transversely positioned tubular frame members 18 which support the same. The metal sheet 54 is also welded to the vertical extending portions 66 at the ends of the upper transversely disposed portions 12 of the I-beams 10. The metal sheet 54 does not have the thickness to equal the height of the plurality of extruded floor sections 26 such that it creates a recess referred to as the coil well 58 formed between the upper transversely disposed portions 12 of the I-beams 10. Although a thicker metal sheet could be used, significant additional weight would be added and the advantage of a coil well would be lost. The metal sheet 54 may extend along the entire length of the trailer bed or be positioned at discrete locations of the trailer.

Referring to FIG. 4, a cross-sectional view of the improvement of the present invention is shown in floor 70 having a coil well 68. The floor system 70 is shown to comprise a plurality of extruded floor sections 26 as previously described, but also comprises a flat solid sheet of metal 64 that extends between the webs 11 of the I-beams 10'. The metal sheet 64 is welded to the webs 11 as well as welded to the vertical extending portions 76 at the ends of the upper transversely disposed portions 12 of the I-beams 10'. The vertical extending portions 76 are shorter than the vertical extending portions 66 on the opposite sides of the I-beams such that the metal sheet 64 can slide between the transversely positioned tubular frame members 18 and the vertical extending portions 76 at the ends of the upper transversely disposed portions 12 of the I-beams 10'. The metal sheet 64 is welded to each of the transversely positioned tubular frame members 18 which support the same. The extension of the metal sheet 64 forms a square with the I-beam 10' at either end which significantly improves the load carrying capacity or strength of the trailer. The structural square formed by metal sheet 64 and the I-beam 10' typically adds about 12% to the section properties of the beam. The metal sheet 64 may extend along the entire length of the trailer bed or be positioned at discrete locations of the trailer. As previously mentioned, the neck area 40 is the weakest part of the beam. In a preferred embodiment, metal sheet 64 is used only in the neck area 40 of the trailer, extending typically from the front of the trailer extending toward the back approximately 16 feet. The remainder of the trailer is typically constructed using the conventional metal sheet 54 as shown in FIG. 3.

Although several specific embodiments of the invention have been described herein, various modifications or variations will be apparent to one skilled in the art without departing from the principles and teachings herein. Accordingly, the invention is not to be limited to the specific embodiments illustrated, but is only intended to be limited by the scope of the appended claims.

What is claimed is:

1. A trailer comprising:
    at least two I-beams wherein each I-beam comprises a web portion, a chord portion generally perpendicular to said web portion, and an extension portion at an end of said chord portion positioned generally parallel to said web portion;
    a plurality of transverse beam members attached to said I-beams and positioned generally perpendicular to the webs of the I-beams;
    a metal plate extending between said web portions of said at least two I-beams and positioned between said plurality of transverse beam members and said extension portion of said at least two I-beams.

2. The trailer of claim 1, wherein said metal plate is welded to said web portion of a first of said I-beams and said web portion of a second of said I-beams; and
    wherein said metal plate is welded to said extension portion of said first I-beam and said extension portion of said second I-beam.

3. The trailer of claim 2, wherein an attachment of said metal plate and said I-beams form a generally square structural section on ends of said metal plate.

4. The trailer of claim 2, wherein said metal plate is generally positioned at a neck area of the trailer.

5. The trailer of claim 2, wherein said metal plate extends the length of said trail.

6. The trailer of claim 4 further comprising a second metal plate, wherein said second metal plate extends between said extending portion of said first I-beam and said extending portion of said second I-beam; and wherein said second metal plate is welded to said extension portion of said first I-beam and said extension portion of said second I-beam.

7. A trailer comprising:

a first I-beam and a second I-beam positioned generally parallel to each other, wherein each I-beam comprises a web portion, an upper chord portion generally perpendicular to said web portion, a first extension portion at an inboard end of said chord portion positioned generally parallel to said web portion, a second extension portion at an outboard end of said chord portion positioned generally parallel to said web portion;

a plurality of transverse beam members attached to said first I-beam and said second I-beam and positioned generally perpendicular to said webs of said I-beams;

a first trailer floor portion extending between said web portions of said at least two I-beams and positioned between said plurality of transverse beam members and said first extension portion of said first I-beam and said second I-beam;

a second trailer floor portion fixably attached to said second extension portion of said first I-beam;

a third trailer floor portion fixably attached to said second extension portion of said second I-beam;

wherein said second extension portion of said first I-beam and said second I-beam extends to said plurality of transverse beam members; and wherein said first extension portion of said first I-beam and said second I-beam is generally shorter than said second extension portion of said first I-beam and said second I-beam providing clearance for said first trailer floor portion.

8. The trailer of claim 7, wherein said first trailer floor portion is an aluminum plate.

9. The trailer of claim 8, wherein said aluminum plate is welded to said I-beams.

10. The trailer of claim 9, wherein an attachment of said aluminum plate and said I-beams form a generally square structural section on ends of said aluminum plate.

11. The trailer of claim 7, wherein said first trailer floor portion is generally positioned longitudinally at a neck area of the trailer.

12. The trailer of claim 7, wherein said first trailer floor portion is lower than said second trailer floor portion and said third trailer floor portion.

13. The trailer of claim 7, wherein said first I-beam, said second I-beam, said plurality of transverse beams, said first trailer floor portion, said second trailer floor portion, and said third trailer floor portion are comprised of aluminum.

14. The trailer of claim 12, wherein said first I-beam, said second I-beam, and said first trailer floor portion form a coil well.

* * * * *